US011869036B2

(12) United States Patent
Zhang et al.

(10) Patent No.: US 11,869,036 B2
(45) Date of Patent: Jan. 9, 2024

(54) SYSTEM AND METHOD FOR LOGISTICAL ASSISTANCE WITH DATA EXCHANGE (71) Applicant: DoorDash, Inc., San Francisco, CA (US)

(72) Inventors: Erik Zhang, Fremont, CA (US); Ujjwal Gulecha, San Mateo, CA (US)

(73) Assignee: DoorDash, Inc., San Francisco, CA (US)

( * ) Notice: Subject to any disclaimer, the term of this patent is extended or adjusted under 35 U.S.C. 154(b) by 0 days.

(21) Appl. No.: 17/697,297

(22) Filed: Mar. 17, 2022

(65) Prior Publication Data
US 2022/0301008 A1  Sep. 22, 2022

Related U.S. Application Data (60) Provisional application No. 63/163,211, filed on Mar. 19, 2021.

(51) Int. Cl.
G06Q 30/02 (2023.01)
G06Q 30/0251 (2023.01)

(52) U.S. Cl.
CPC ............... G06Q 30/0253 (2013.01)

(58) Field of Classification Search
CPC .................. G06Q 30/0207–0277
See application file for complete search history.

(56) References Cited

U.S. PATENT DOCUMENTS

| 10,907,983 | B1* | 2/2021 | Singh | G08G 1/09685 |
| 2002/0156700 | A1* | 10/2002 | Gray | G06Q 30/0641 |
| | | | | 705/27.1 |
| 2003/0004798 | A1* | 1/2003 | McAuliffe | G06Q 30/0601 |
| | | | | 705/26.1 |
| 2005/0159220 | A1* | 7/2005 | Wilson | A63F 13/12 |
| | | | | 463/40 |
| 2007/0244750 | A1* | 10/2007 | Grannan | G06Q 30/02 |
| | | | | 705/14.56 |
| 2010/0228631 | A1* | 9/2010 | Zhang | G06Q 30/0277 |
| | | | | 709/219 |

(Continued)

OTHER PUBLICATIONS

Netfood: A Software System for Food Ordering and Delivery; Domokos et al., SISY 2018 • IEEE 16th International Symposium on Intelligent Systems and Informatics • Sep. 13-15, 2018, Subotica, Serbia.*

Primary Examiner — David J Stoltenberg
(74) Attorney, Agent, or Firm — Kilpatrick Townsend & Stockton LLP (57) ABSTRACT A method includes storing one or more interest indicators for providing communications for resources associated with a plurality of second service providers, and then receiving, a fulfillment request from an application in an end user device. The fulfillment request being for resources to be fulfilled by a first service provider. The method also includes determining one or more interest indicators from the retrieved interest indicators associated with the second service providers and providing one or more communications associated with at least one of the determined one or more interest indicators of one or more second service providers to the application along with a display of a service provider identifier of the first service provider or the resources to be fulfilled by the first service provider.

18 Claims, 7 Drawing Sheets (56) References Cited

U.S. PATENT DOCUMENTS

| | | | |
|---|---|---|---|
| 2012/0053991 A1* | 3/2012 | Shimizu | G06Q 30/0205 |
| | | | 705/7.34 |
| 2013/0066705 A1* | 3/2013 | Umeda | G06Q 30/0241 |
| | | | 705/14.41 |
| 2016/0071187 A1* | 3/2016 | Bhosle | G06Q 30/0603 |
| | | | 705/26.7 |
| 2017/0046736 A1* | 2/2017 | Elmachtoub | G06Q 30/0255 |
| 2017/0372403 A1* | 12/2017 | Jouhikainen | G06Q 20/202 |
| 2018/0253682 A1* | 9/2018 | Gilman | G06Q 20/28 |
| 2019/0109910 A1* | 4/2019 | Sweeney | H04L 65/40 |
| 2019/0113361 A1* | 4/2019 | Droege | G06Q 50/12 |
| 2019/0130320 A1* | 5/2019 | Friend, V | H04W 4/025 |
| 2019/0130354 A1* | 5/2019 | Han | G06Q 10/08355 |
| 2020/0160264 A1* | 5/2020 | Silverman | G06Q 10/06315 |
| 2020/0160428 A1* | 5/2020 | Calvo | G06Q 30/0633 |
| 2020/0279191 A1* | 9/2020 | Koch | G06Q 30/0255 |
| 2021/0037109 A1* | 2/2021 | Wang | H04W 4/50 |
| 2021/0103887 A1* | 4/2021 | Phillips | G06Q 10/0836 |

* cited by examiner

SYSTEM AND METHOD FOR LOGISTICAL ASSISTANCE WITH DATA EXCHANGE

CROSS REFERENCE TO RELATED APPLICATIONS

This application is a non-provisional application of and claims the benefit of U.S. Provisional Application No. 63/163,211 filed on Mar. 19, 2021, which is herein incorporated by reference in its entirety.

BACKGROUND

A conventional resource delivery system can provide resources (e.g., products, food, etc.) to end users on demand. To access such resources, an end user can access an application (e.g., a food delivery application) on an end user device such as a smartphone. Through the application, the user can order resources from a service provider via an application server. The resources can then be delivered to the end user.

While conventional systems such as these are effective, there may be instances where the end user may desire other resources that might be complimentary or supplemental to a current resource that is being obtained by the end user from a particular service provider. Such other resources are typically not presented to the end user, especially if they are provided by other service providers. Further, assuming that the end user is even aware of what such other resources might be, the end user would need to separately communicate with different service providers to obtain those resources. This is inefficient and cumbersome.

Embodiments of the invention address these and other problems individually and collectively.

BRIEF SUMMARY

Embodiments of the invention can include methods, computers, and systems for allowing an end user to efficiently obtain complementary or supplemental resources from service providers that are different than a current service provider with which the user is current interacting.

One embodiment of the invention includes a method comprising: a) storing, by a central server computer in a database, one or more interest indicators for providing communications for resources associated with a plurality of second service providers; b) receiving, by the central server computer, a fulfillment request from an application in an end user device, the fulfillment request being for one or more resources to be fulfilled by a first service provider; c) identifying, by the central server computer one or more transporters operating one or more transport user devices that are capable of satisfying the fulfillment request; d) retrieving, by the central server computer, the stored interest indicators associated with the second service providers from the database; e) determining, by the central server computer, one or more interest indicators from the retrieved interest indicators associated with the second service providers; and f) providing, by the central server computer, one or more communications associated with at least one of the determined one or more interest indicators of one or more second service providers to the application in the end user device along with a display of a service provider identifier associated with the first service provider or the one or more resources to be fulfilled by the first service provider.

Another embodiment of the invention includes a central server computer comprising: a processor; and a non-transitory computer readable medium, the non-transitory computer readable medium comprising instructions, executable by the processor, for implementing operations including: a) storing, in a database, one or more interest indicators for providing communications for resources associated with a plurality of second service providers; b) receiving a fulfillment request from an application in an end user device, the fulfillment request being for one or more resources to be fulfilled by a first service provider; c) identifying one or more transporters operating one or more transport user devices that are capable of satisfying the fulfillment request; d) retrieving the stored interest indicators associated with the second service providers from the database; e) determining one or more interest indicators from the retrieved interest indicators associated with the second service providers; and f) providing one or more communications associated with at least one of the determined one or more interest indicators of one or more second service providers to the application in the end user device along with a display of a service provider identifier associated with the first service provider or the one or more resources to be fulfilled by the first service provider.

Another embodiment of the invention includes a system comprising: a central server computer comprising a processor, and a non-transitory computer readable medium, the non-transitory computer readable medium comprising instructions, executable by the processor, for implementing operations including a) storing, in a database, one or more interest indicators for providing communications for resources associated with a plurality of second service providers, b) receiving a fulfillment request from an application in an end user device, the fulfillment request being for one or more resources to be fulfilled by a first service provider, c) identifying one or more transporters operating one or more transport user devices that are capable of satisfying the fulfillment request, d) retrieving the stored interest indicators associated with the second service providers from the database, e) determining one or more interest indicators from the retrieved interest indicators associated with the second service providers, and f) providing one or more communications associated with at least one of the determined one or more interest indicators of one or more second service providers to the application in the end user device along with a display of a service provider identifier associated with the first service provider or the one or more resources to be fulfilled by the first service provider; and the one or more transport user devices.

Further details regarding these and other embodiments can be found in the Detailed Description and the Figures.

DETAILED DESCRIPTION

Prior to discussing embodiments of the invention, some terms can be described in further detail.

A "user" may include an individual or a computational device. In some embodiments, a user may be associated with one or more personal accounts and/or mobile devices. In some embodiments, the user may be a cardholder, account holder, or consumer.

A "user device" may be any suitable electronic device that can process and communicate information to other electronic devices. The user device may include a processor and a computer-readable medium coupled to the processor, the computer-readable medium comprising code, executable by the processor. The user device may also each include an external communication interface for communicating with each other and other entities. Examples of user devices may include a mobile device (e.g., a mobile phone), a laptop or desktop computer, a wearable device (e.g., smartwatch), etc.

A "server computer" is typically a powerful computer or cluster of computers. For example, the server computer can be a large mainframe, a minicomputer cluster, or a group of servers functioning as a unit. In one example, the server computer may be a database server coupled to a Web server. A server computer can also include a cloud computer.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "interest indicator" can be a set of data that can indicate an interest in participating in an event. In one example, the event may be a transaction with a first service provider, and second service provider may be an originator of the interest indicator. An interest indicator may include at least one or more of the following in any combination: a service provider identifier, one or more resource identifiers for resources (e.g., goods such as food) that are offered by the service provider, prices associated with the one or more resources, data relating to one or more communications for the one or more resources (e.g., data for images of the resources of descriptions thereof, as well as links to the foregoing), a value associated with the interest indicator (e.g., a bid to have a communication with resources from one service provider placed alongside resources from another service provider), active dates for which the interest indicator may be accepted, a minimum and/or maximum budget for acceptance of the interest indicator, a minimum and/or maximum overall communication placement budget for the service provider providing the interest indicator, a list of service providers that cannot receive the communication, a list of service providers that can receive the communication, communication addresses for the service provider (e.g., a URL), etc.

A "fulfillment request" can be a request to provide a resource in response to a request. For example, a fulfillment request can include an initial communication from an end user device to a central server computer for a first service provider computer to fulfill a purchase request for a resource such as food. A fulfillment request can be in an initial state, a partially completed state, or a final state. After the fulfillment request is in a final state, it can be accepted by the central server computer, and the central server computer can send a fulfillment request confirmation to the end user device.

A "transporter" can be an entity that transports something. A transporter can be a person that transports a resource using a transportation device (e.g., a car). In other embodiments, a transporter can be a transportation device that may or may not be operated by a human. Examples of transportation devices include cars, boats, scooters, bicycles, drones, airplanes, etc.

The term "artificial intelligence model" or "machine learning model" can include a model that may be used to predict outcomes to achieve a pre-defined goal. A machine learning model may be developed using a learning algorithm, in which training data is classified based on known or inferred patterns.

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation Embodiments of the invention can include a system for displaying relevant cross-service provider (e.g., merchant) communications (e.g., advertisements) at a pre-checkout or checkout page on an application on an end user device operated by a user. Some embodiments of the invention can be described in the context of users ordering food from a food service delivery application. During the process of ordering a food item from a first service provider by an end user, the end user can be presented with a communication for a second service provider offering a different food item that is complimentary or supplemental to the food item offered by the first service provider. The communication with the food item offered by the second service provider can be selected by the end user, and the purchase of that food item can be added to the list of food items from the first service provider on a checkout page of the application. The end user can then purchase the food items from the first and second service providers in a single payment transaction. The purchase of the food items from the first and second service providers can be done without substantially increasing the overall delivery time to the end user, relative to the situation where the food item(s) were only purchased from the first service provider. Although the delivery of food items is discussed in detail in some of the examples herein, it is understood that embodiments of the invention can be used with other types of physical resources such as grocery items, cosmetics, hardware products, cookware, etc.

In some embodiments, a central server computer can manage the process of selecting and presenting communications from the second service providers when users are interacting with a particular first service provider. Because many communications could be presented to the end user, in some embodiments, the central server computer can allow the second service providers provide interest indicators with bid amounts. The bid amounts can be amounts that the second service providers would be willing to pay to the first service providers and/or the entity that manages the central server computer for the display of the second service providers' communications at the checkout or pre-checkout pages of the first service providers. The bid amounts can be one of many factors that can used to select the communication(s) for presentation to the end user. Other factors that can be used to select communications for the end user may include end user preferences, relevance or compatibility of the resources to be purchased from the first service provider, proximity of the second service providers to the first service provider, etc. In some embodiments, a machine learning algorithm such as a neural network can be used to select the communications for presentation to the end user.

Figure 1:
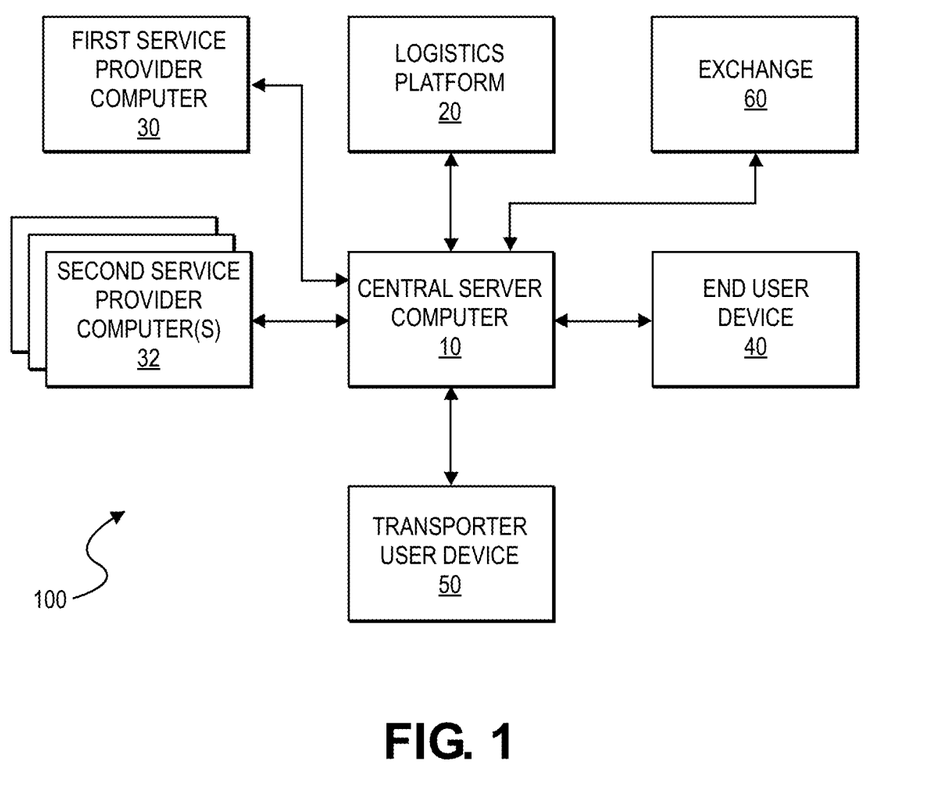
FIG. 1 shows a block diagram of a system according to embodiments.

FIG. 1 shows a system 100 according to embodiments. The system includes a central server computer 10 in communication with an end user device 40 and one or more transporter user devices 50. The central server computer 10 may also be in communication with an exchange 60. The central server computer 10 may also be in communication with a logistics platform 20. One or more service provider computers including a first service provider computer 30 and two or more second service provider computers 32 may be in communication with the central server computer 10.

The logistics platform 20 can include a location determination system, which can determine the location of various user devices such as transporter user devices (e.g., transporter user device 50) and end user devices (e.g., end user device 40). The logistics platform 20 can also include routing logic to efficiently route transporters using the transport user devices to various service providers that have the resources that are to be delivered to the end users. The logistics platform 20 can be part of the central server computer 10 or can be system that is separate from the central server computer 10.

The first service provider computer 30 can be one of many first service provider computers and may communicate with the central server computer 10 via one or more APIs and may be operated by first service providers. First service providers may initially present resources such as goods and/or services to end users via an application on the end user device 40. In some embodiments, a first service provider is a service provider that has a resource that the end user wants to obtain. In embodiments of the invention, an end user can interact with an interaction application on an end user device to purchase a resource from the first service provider, before any resources from any second service providers are presented to the end user on the interaction application.

The second service provider computers 32 may communicate with the central server computer 10 via one or more APIs and may be operated by second service providers that can offer resources such as goods and/or services to end users like the first service providers. However, the second service providers typically provide resources that are complimentary and/or supplemental to resources provided by the first service provider. A particular service provider could be either a first service provider or a second service provider, depending upon the context of an end user's interaction with the central server computer 10.

The exchange 60 can be a system or software that can facilitate the storage, coordination and/or selection of interest indicators provided by the second service providers operating the second service provider computers 32.

The communication networks that allow the entities in FIG. 1 to communicate may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

An exemplary method according to an embodiment of the invention can be performed using the system in FIG. 1. The method can include receiving, by the central server computer 10, one or more bids (or other types of interest indicators) for providing communications for resources provided by second service providers along with orders for resources provided by a first service provider. The first service provider may operate the first service provider computer 30, and the second service providers may operate one or more of the second service provider computers 32. The first service provider may be a restaurant of a first type, while the second service provider may be a restaurant of a second type.

The method may also comprise receiving, by the central server computer 10, one or more acceptances of the one or more bids from the first service provider or a computer program operating on behalf of the first service provider. The method may also comprise storing, by the central server computer 10, data relating to the one or more accepted bids in a database. The placing of bids and the subsequent acceptance of bids may be managed by the exchange 60, which may be a separate entity or may reside in the central server computer 10.

After the data relating to the one or more bids are stored in the central server computer 10, the central server computer 10 may receive a fulfillment request from an end user device 40. The fulfillment request can be fulfilled by the first service provider operating a first service provider computer 30.

The method may also comprise identifying, by the central server computer 10 one or more transporters operating one or more transport user devices 50 that are capable of satisfying the fulfillment request. The central server computer 10 can determine one or more of the second service providers located proximate to either a location of the first service provider or the one or more transporters. The logistics platform 20 may provide real time data regarding locations of the various service providers, transporters, and end users.

The method may also comprise retrieving, by the central server computer 10, data relating to the one or accepted bids, and determining one or more second service providers based on the data relating to the one or more accepted bids. For instance, the central server computer 10 may filter select bids of second service providers that provide resources that are preferred by the end user conducting the current interaction. Other details regarding the process of selecting bids are provided below.

The method may also comprise providing, by the central server computer 10, one or more communications associated with the one or more second service providers to the end user device. The communications may be in the form of advertisements for the resources offered by the one or more second service providers that were previously retrieved. The advertisements may be displayed along with a list of resources on a check out page of the first service provider.

Illustratively, if an end user operating the end user device 40 was intending to order a pizza from a first service provider operating the first service provider computer 30, then the central server computer 10 (on behalf of a second service provider) could select an accepted bid associated with an offer from a second service provider to sell ice cream. That accepted bid may be associated with data representing an advertisement for ice cream sold by the second service provider. This advertisement for ice cream may be presented alongside the checkout page for the pizza being ordered by the end user from the first service provider. The user could then decide if the user wants to purchase the ice cream with the pizza, and the total at the checkout page can be updated accordingly.

Figure 2A:
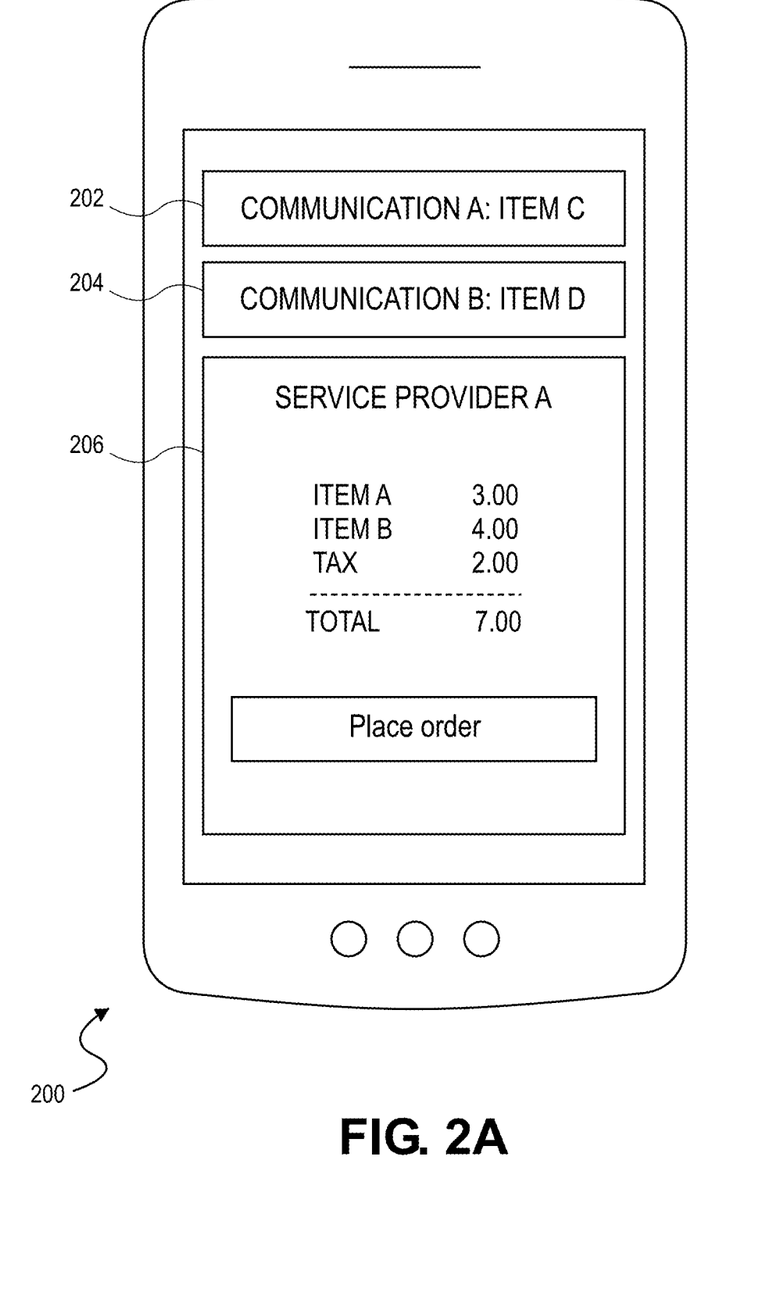
FIGS. 2A and 2B show user interfaces of a user device according to embodiments.

FIG. 2A shows a user device 200 with a user interface which shows a pre-checkout or checkout page. The user interface includes a first portion 206, which can show resources ("items A and B") from a first service provider ("service provider A") (identified by a first service provider identifier) that the user has placed into a shopping cart, and a second portion with communications 202, 204. The communications 202, 204 may be advertisements for two resources offered for sale by two second service providers. The two communications 202, 204 may be associated with interest indicators, which were selected by a central server computer for presentation to the end user of the user device 200. In some embodiments, the communications 202, 204, can be present on store-specific pages, store page banners, post checkout banners, and item offer carousels. The two communications 202, 204 may be presented on the user interface after the user specifically manifested an intent to purchase resources from the first service provider, but just prior to the user confirming the purchase of the resources from the first service provider. The resources (e.g., items C and D) presented to the end user in the two communications 202, 204 may be complimentary to the resources (e.g., items A and B) being purchased by the user from the first service provider.

If the end user wishes to purchase one or both of the resources in the communications 202, 204, then the end user may select one or both of them. This will result in the addition of the selected resources(s) in the communication (s) 202, 204 to the list of resources to be purchased in the first portion 206 of the user interface. For example, if the end user selects communication 202, then the resource (i.e., item C) in the communication 202 is added to the list of resources (e.g., items A and B) to purchase in the first portion 206 of the user interface as shown in FIG. 2B.

Figure 2B:
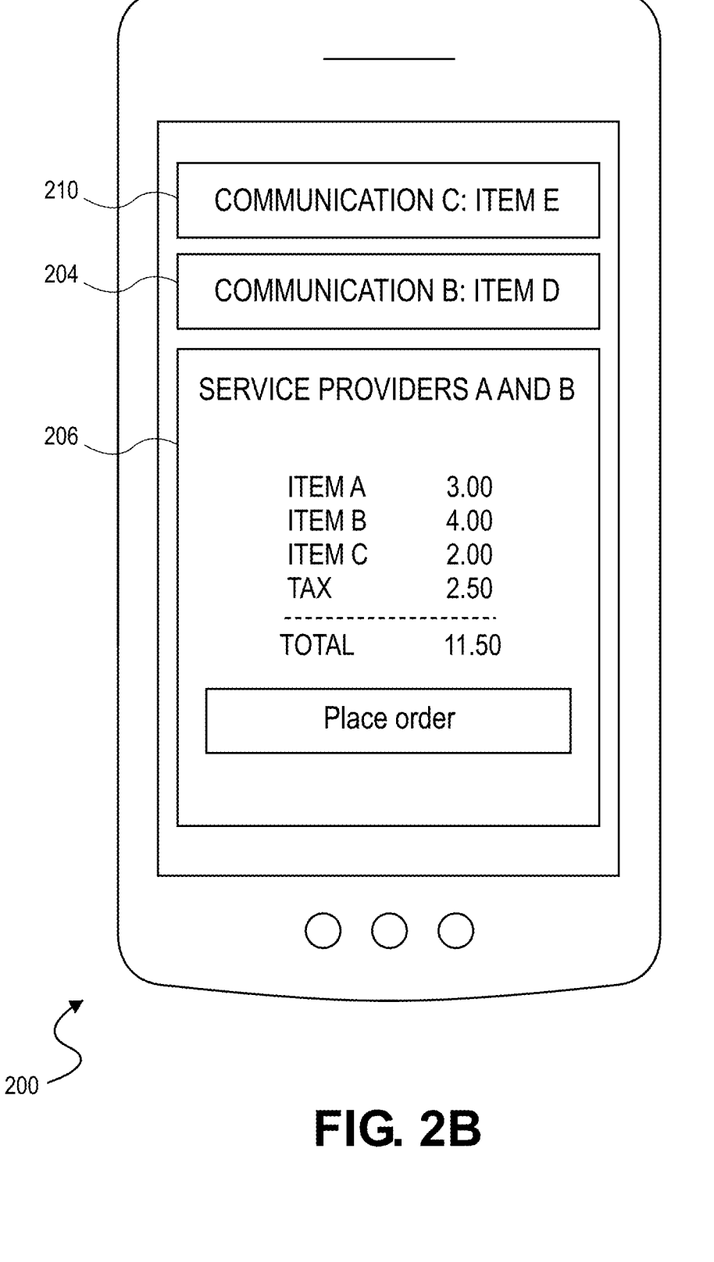

Also, as shown in FIG. 2B, a new communication 210 may be shown to replace the prior communication 202, before the user selects "place order" to complete the request. The new communication 210 may offer yet another resource (item E) for the end user to consider purchasing before a final purchase decision is made by the end user. The new communication 210 may be from the second service provider(s) associated with one of the prior communications 202, 204, or it may be a different second service provider. As will be described in further detail below, the communications 202, 204, and 210 in FIGS. 2A and 2B may be associated with interest indicators that were previously ranked by the central server computer. The interest indicators may be associated with different second service providers that are either proximate to the first service provider (e.g., service provider A) or the one or more transporters that would obtain the resources (e.g., items A and B) from the first service provider and deliver them to the end user.

Figure 3:
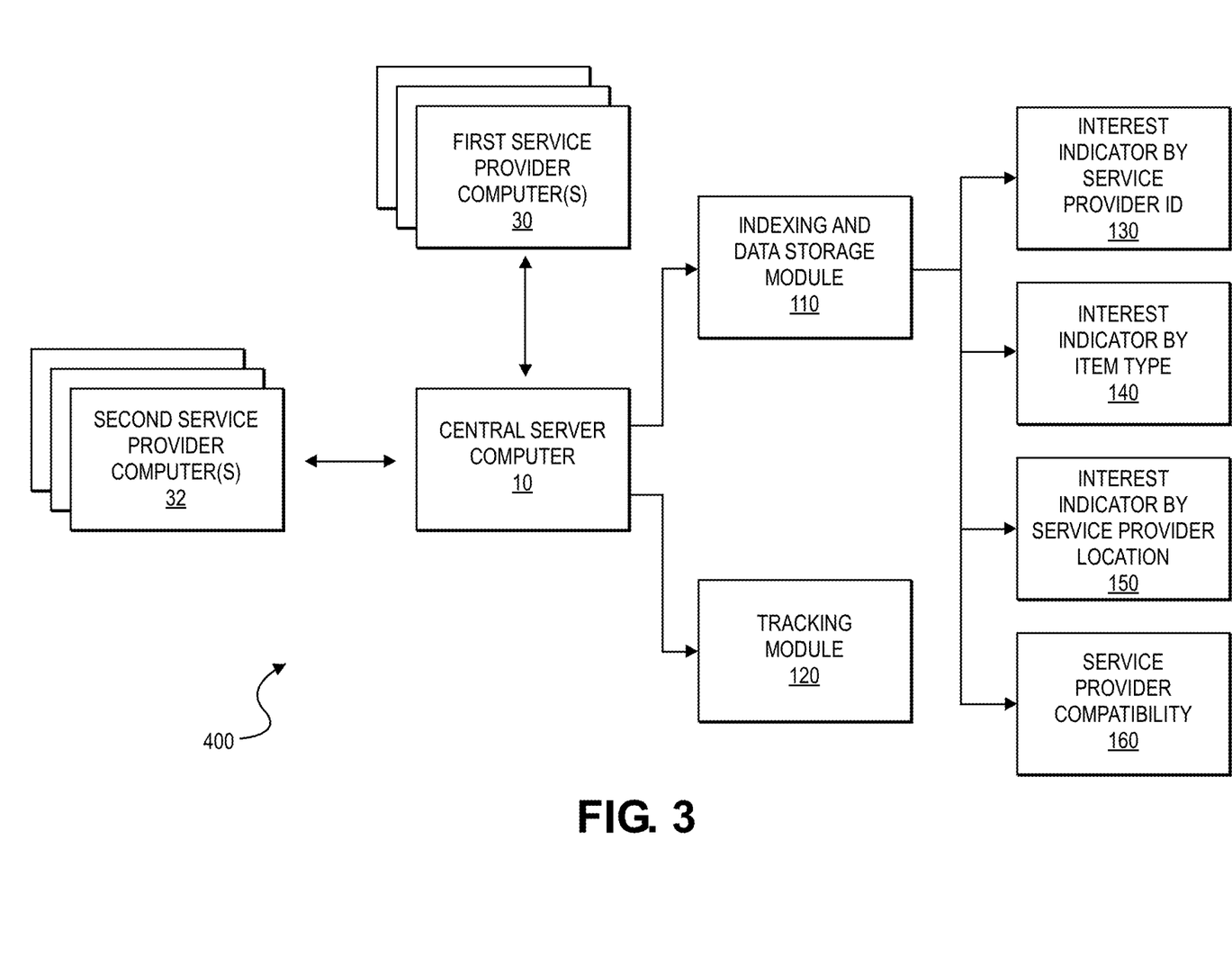
FIG. 3 shows a block diagram illustrating a method for entering and arranging interest indicators according to embodiments of the invention.

FIG. 3 shows a diagram with various components according to embodiments of the invention. FIG. 3 can be used to illustrate methods for receiving interest indicators and storing interest indicators and their associated communications.

FIG. 3 shows a plurality of first service provider computers 30 and a plurality of second service provider computers 32 interacting with a central server computer 10. The first service provider computers 30 may be operated by first service providers that may offer resources for end users. The second service provider computers 32 may be operated by second service providers that may wish to provide communications (e.g., advertise) to end users when they are interacting with the first service providers on applications on their end user devices.

The central server computer 10 may also contain or communicate with an indexing and data storage module 110 and a tracking module 120. The tracking module 120 can be programmed to keep track of budgets for the second service providers operating the second service provider computers 32. The indexing and data storage module 110 can be used to index interest indicators for rapid retrieval. The indexing and data storage module 110 can index interest indicators by service provider identifier 130, by item type 140, by service provider location 150, and by service provider compatibility.

In embodiments of the invention, a second service provider (e.g., a merchant) operating a second service provider computer 32 can provide an interest indicator to the central server computer 10. This can be done via a user interface on the second service provider computer 32 provided by the central server computer 10. Examples of data that can be in an interest indicator are provided above. In some embodiments, the interest indicator may include a bid amount. The bid amount may be an amount that a second service provider is willing to pay (e.g., to a first service provider) to place a communication such as an offer to purchase a resource such as a food item from the second service provider on a page associated with a first service provider. In some embodiments, the interest indicator may comprise information including, but not limited to: (i) an identifier for the second service provider (e.g., store_ID_5), (ii) an identifier for the resource to be offered (e.g., item_ID_2), (iii) active dates or an expiration date for the interest indicator (e.g., from Apr. 1, 2022 to May 1, 2022), and (iv) a maximum bid amount and a minimum bid amount for the communication (from $0.75 to $0.25). The interest indicator may also include an exclusion list of first service providers that the second service provider does not wish to provide its communication. The interest indicator may also include an inclusion list of first service providers that the second service provider does with to provide its communication.

Other information that may be provided by the second service providers to the central server computer 10 may include a maximum and/or minimum budget amount for providing its communications to various first service providers over a predetermined period of time. For example, a second service provider may set an overall maximum budget of $1000 and a minimum budget of $5 to pay for the placement of any of its communications with first service providers.

In some embodiments, the second service provider that provides the interest indicator to the central server computer 10 may not know how many times the communication associated interest indicator may ultimately be chosen by the central server computer 10. For example, a communication and its associated interest indicator may be provided to the central server computer 10, and the central server computer 10 may store it in its database. When fulfillment requests are received at the central server computer 10 for resources offered by the first service providers operating the first service provider computers 30, the central server computer 10 will run an algorithm (which is described in further detail below) that selects an interest indicator and its associated communication. It is possible that a single interest indicator from a particular second service provider is frequently selected by the central server computer 10 (e.g., because the second service provider is willing to pay a high amount for the placement of its communication). The second service provider can set a maximum overall budget (e.g., $100) so that the second service provider does not unexpectedly pay out more than it intends to pay out. This might be useful in situations where a second service provider wishes to provide higher bid amounts to increase the chances that a certain amount excess inventory is sold. However, the second service provider may only wish to sell the excess inventory and not extra inventory within a predetermined period of time, so the second service provider can put a limit on the amount that it is will to spend for placing such communications with first service providers. As noted above, the tracking module 120 associated with the central server computer 10 can keep track of the number of selected interest indicators of second service providers against their budgets.

Exemplary code for request and response patterns between a service provider computer and a central server computer in the interest indicator creation process is provided below.

```
service BidService {
  rpc GetPossibleBidConfigurations
    (GetPossibleBidConfigurationsRequest)
  returns
  (GetPossibleBidConfigurationsResponse);
  rpc SubmitBid (SubmitBidRequest) returns (SubmitBidResponse);
  Rpc SetStoreSellingSpotConfig(SetStoreSellingSpotConfigRequest)
    returns
  (SetStoreSellingSpotConfigResponse)
}
message GetPossibleBidConfigurationsRequest {
  string store_id = 1;
  string item_id = 2;
}
message GetPossibleBidConfigurationsResponse {
  BidOptions bid_options = 1;
}
message SubmitBidRequest {
  Bid = 1;
}
message SubmitBidResponse {
  Bid = 1;
}
message Bid {
  site.protobuf.StringValue item_id = 1;
  site.protobuf.StringValue store_id = 2;
  site.protobuf.Int32Value bid = 3;
  Budget = 4;
  DateRange dates_active = 5;
  bool is_active = 6;
  Bool enable_rev_sharing = 7;
  Repeated string excluded_stores = 8;
}
message BidOptions {
  site.protobuf.Int32Value maximum_bid_amount = 1;
  site.protobuf.Int32Value minimum_bid_amount = 2;
  site.protobuf.Int32Value maximum_budget_amount = 3;
  site.protobuf.Int32Value minimum_budget_amount = 4;
}
message SetStoreSellingSpotConfigRequest {
  StoreSellingConfig config = 1;
```

-continued

```
}
message SetStoreSellingSpotConfigResponse {
  StoreSellingConfig config = 1;
}
message StoreSellingConfig {
  Bool accept_all = 1;
  Repeated string excluded_store_ids = 2;
  Repeated string included_store_ids = 3;
}
Message Budget {
  Int daily_budget;
  Int monthly_budget;
  Int weekly_budget;
}
```

After the central server computer 10 receives an interest indicator from a second service provider computer 32, a data object representing the received interest indicator is created by the central server computer 10 and is stored in a database assessable to the central server computer 10. Each of the other second service providers operating other second service provider computers 32 may provide other types of interest indicators and other data objects that may be stored in the database.

In some embodiments, the central server computer 10 determines (e.g., selects) an interest indicator and its associated communication from among many such interest indicators and communications after a fulfillment request is received by the central server computer 10, but before a transaction involving the fulfillment request is completed. As such, the retrieval of interest indicators from the database, the ranking of the retrieved interest indicators, and the selection of a set of interest indicators by the central server computer 10 needs to occur quickly. To assist with the rapid retrieval of interest indicators, embodiments of the invention can provide for an improved data structure and indexing system that allows for the interest indicators to be rapidly retrieved from the database.

The central server computer 10 can use the indexing and data storage module 110 to index interest indictors (or their data objects) so that they can be quickly retrieved and processed by the central server computer 10. The indexing and data storage module 110 can store the interest indicators by service provider identifier 130, item type 140, service provider location 150, and/or service provider compatibility 160.

The indexing and data storage module 110 can store the interest indicators by service provider identifier 130. The interest indicators can be arranged by service provider identifier. For example, the database may include interest indicators created by service providers A, B, and C, and they may be organized according to service provider identifiers for service providers A, B, and C.

The indexing and data storage module 110 can also store the interest indicators by item type. For example, the database may include data objects that are arranged by item type. For example, service providers A, B, and C may provide ice cream as a resource. Interest indicators for ice cream from service providers A, B, and C may be indexed under the item type "ice cream."

The indexing and data storage module 110 may also store interest indicators by service provider location. For example, interest indicators could be stored by a particular geohash, or other location based system. The locations of the service providers can be determined by the central server computer

10 when the interest indicators are created. Interest indicators of service providers within a particular geographic area may be stored together.

The indexing and data storage module 110 may also store interest indicators according to service provider compatibility. For example, a second service provider A may wish to provide its communications to any of first service providers B and C, but not D. The interest indictors may be stored or indexed according to these preferences.

An exemplary elasticsearch index indicative of service provider compatibility and/or reference can be as follows:

```
{
  "store-1": {
    "excludes": [ ], // store-1 excludes certain other stores
    "is_excluded_by": [ ], // store-1 gets excluded by certain
    other stores
    "includes": [ ] // used only if store-1 does not opt in to allows_all,
    "allows_all": true // allows all stores for advertising
  }
}
Examples:
store-1 wants to exclude store2, store3 and store4
{
  "store-1": {
    "excludes": [store-2, store-3, store-4],
    "is_excluded_by": [ ],
    "includes": [ ],
    "allows_all": false
  }
}
store-2 wants to exclude store4
{
  "store-2": {
    "excludes": [store-4],
    "is_excluded_by": [ ],
    "includes": [ ],
    "allows_all": false
  }
}
store-5 and store-6 want to advertise on store-1
{
  "store-1": {
    "excludes": [store-4],
    "is_excluded_by": [store-5, store-6] ,
    "includes": [ ]',
    "allows_all": false
  }
}
store-8 -> I want to only allow store-7 and store-9 to advertise
on my checkout screen
{
  "store-8": {
    "excludes": [ ],
    "is_excluded_by": [ ] ,
    "includes": [store-7, store-9]
    "allows_all": false
  }
}
```

The receipt of an interest indicator (including a bid amount) by the central server computer 10 can result in multiple actions. First, it places the data object for interest indicator into a bids tracking service operated by the above-described tracking module 120 (see also 504G in FIG. 5). Second, the interest indicator is indexed in such a way that makes it easy to locate and retrieve. The central server computer 10 can retrieve interest indicators when one or more of the following are present: a) the interest indicators are active; b) interest indicators are easily located by item type to find relevant bids for the end user's context; c) interest indicators are retrieved by service provider identifier; and d) interest indicators are retrieved by geo-hash to only fetch logistically feasible interest indicators.

Figure 4:
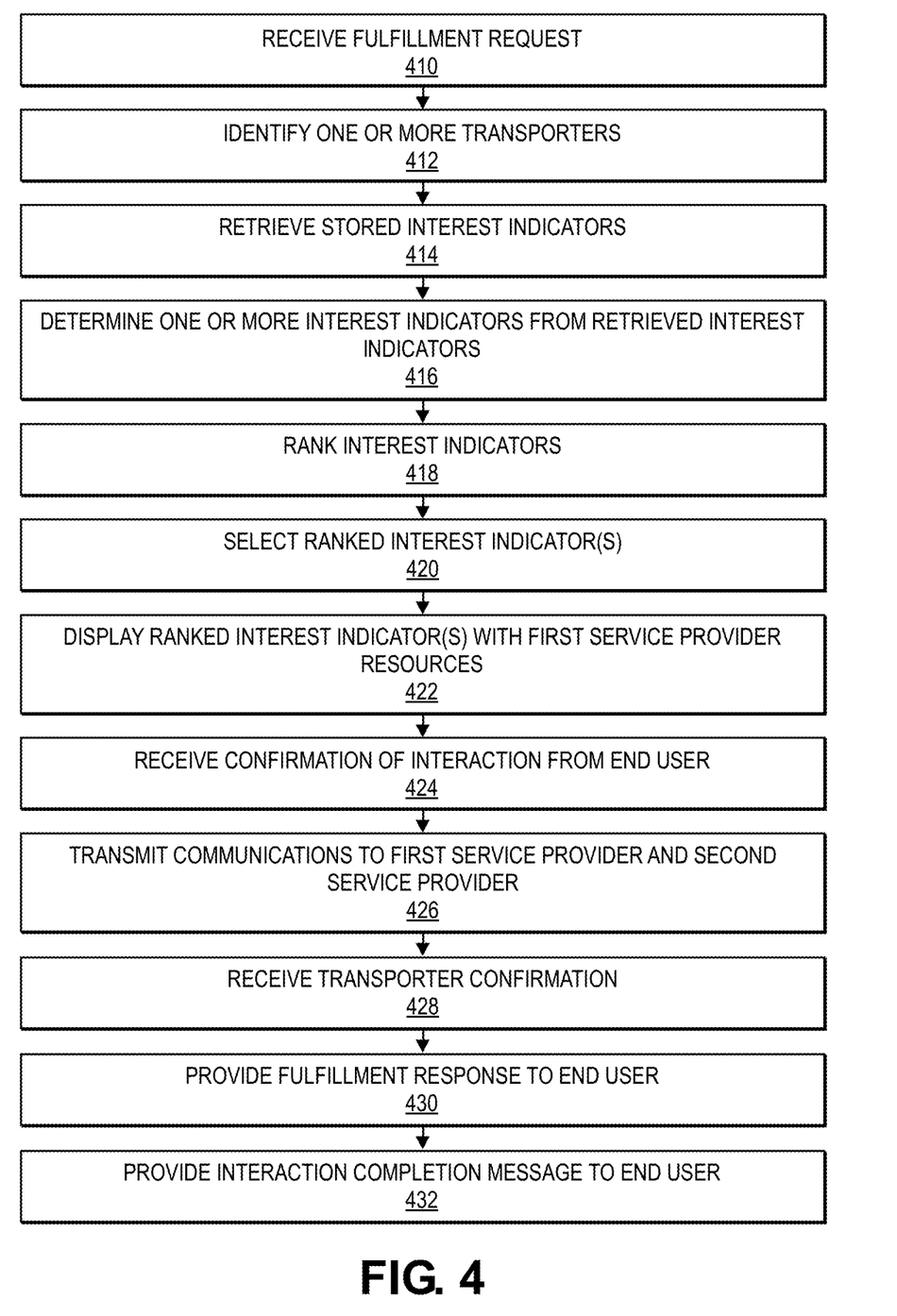
FIG. 4 shows a flowchart illustrating methods according to embodiments of the invention.

FIG. 4 shows a flowchart illustrating methods according to embodiments of the invention. In the description below, reference may also be made to elements in FIG. 1. Note that embodiments of the invention are not limited to what is shown in FIG. 4 and may include additional steps not shown in FIG. 4, may omit some steps, and may also perform steps in a different order than shown.

In step 410, a central server computer 10 can receive a fulfillment request from an end user interacting with an application in the end user device 40. The fulfillment request can be for one or more resources to be fulfilled by a first service provider operating a first service provider computer 30. The end user operating the end user device 40 may have selected the first service provider from among several potential first service providers. Illustratively, the application on the end user device 40 may be a resource delivery application such as a food delivery application. The food delivery application could provide for the delivery of food to a user from various restaurants. For example, the fulfillment request may be a request to purchase food (e.g., pizza) offered by a first service provider (e.g., a pizza parlor). The fulfillment request may be initiated by the end user's selection of a particular resource (e.g., a food item such as a pizza). However, the fulfillment request is not yet fully processed at step 410.

In step 412, the central server computer 10 can then identify one or more transporters operating one or more transport user devices that are capable of satisfying the fulfillment request. For example, once the fulfillment request is initiated or shortly after the fulfillment request is completed, the central server computer 10 communicates with the logistics platform 20 to determine which transporter user devices 50 are proximate to the first service provider. For example, the logistics platform 20 may determine a set of transporter user devices 50 are within 1 mile of the first service provider. Note that step 412 could occur any time prior to step 428 in the method in other embodiments.

In step 414, after receiving the fulfillment request, the central server computer 10 can retrieve the stored interest indicators associated with the second service providers from the database to form a first group of interest indicators. This first group of interest indicators may be retrieved using any suitable grouping process.

In one example, the central server computer 10 may retrieve interest indicators of second service providers that are compatible with the first service provider. As noted above, the second service providers may have indicated a desire to place communications with some first service providers, but not others. The first service provider may have indicated to the central server computer that it is willing to present communications from some second service providers, but not others. The interest indicators that satisfy these criteria form a first group of interest indicators. In another example, the central server computer 10 may also retrieve interest indicators by the types of resources currently being selected by the end user. For example, the end user may have selected a pizza on a page showing the menu of a pizza parlor, and interest indicators for resources that might compliment a pizza (e.g., a salad, dessert, etc.) may be retrieved from the database.

In some embodiments, the central server computer 10 may first determine the first group of interest indicators by determining the associated second service providers that are proximate to the first service provider or the one or more transporters operating transporter user devices, and those interest indicators may be retrieved from the database. The interest indicators of second service providers that are too far away from either the first service provider and/or the one or more transporters may not be suitable. This is because it would take too long for the transporters to obtain resources from those second service providers, and the delivery of the resource(s) from the first service provider to the end user would be delayed. For example, the central server computer 10 may determine that a second service provider is located ten miles from the first service provider, in a direction opposite to where the end user is located. The central server computer can exclude this interest indicator when forming a subsequent group of interest indicators, since obtaining the resource from the second service provider would significantly increase the delivery time of a resource from the first service provider to the end user.

In step 416, after retrieving the stored interest indicators, the central server computer 10 can determine one or more interest indicators from the retrieved interest indicators associated with the second service providers. The determination of interest indicators can include using certain criteria. For example, after the central server computer 10 obtains the first group of interest indicators, the central server computer 10 may exclude interest indicators from the first group of interest indicators by determining which interest indicators are from service providers that were to be specifically excluded at the request of the first service provider to form a second group of interest indicators. After this is done, the central server computer 10 may determine if the second service providers associated with the interest indicators in the second group of interest indicators are compatible with the first service provider. If they are not, then their interest indicators may be excluded from the second group of interest indicators to form a third group of interest indicators. Lastly, the central server computer 10 may analyze the resources associated with the interest indicators in the third group of interest indicators to determine if they are compatible with the resources of the first service provider that were selected by the end user. For example, an interest indicator associated with a communication for fried rice from a second service provider may not be compatible if an end user intends to purchase a pizza from a first service provider. The interest indicator associated with fried rice would therefore be excluded from further consideration. This may then result in a fourth group of interest indicators. The interest indicators in the fourth group of interest indicators can all be considered viable candidate interest indicators that could have communications that are relevant and compatible with the resources of the first service provider being selected by the end user.

In steps 418 and 420, the interest indicators in the viable candidate group of interest indicators may then be ranked and then selected, so that an optimal interest indicator(s) and its associated communication(s) are chosen. In some embodiments, the central server computer 10 retrieves the interest indicators from a long term data database, and then loads the candidate interest indicators in a short term data database, so that the interest indicators can be ranked. They can then be presented to the end user by retrieving them from short term data database according to their ranking.

In some embodiments, when ranking the interest indicators, the central server computer 10 can obtain a current context for the current fulfillment request. This can be done by evaluating the user context, the user cart details, and the first service provider details. For example, the user context details may include click history of the end user, resource type preference of the end user (e.g., cuisine preference of the end user), and brand preference of the end user. The user cart details may include item details, item descriptions, and the number of items to be purchased. The first service provider details may include the first service provider's location (e.g., latitude/longitude) and operating hours. Another factor that can be used when ranking interest indicators relates to the conversion probability of a resource offered by the second service provider. For example, data in the central server computer 500 can indicate that a particular resource (e.g., a specific flavor of ice cream by a second service provider) is purchased frequently when a particular type of resource (e.g., a hamburger) by a first service provider is also purchased. This can be a factor in ranking an interest indicator as well.

In some embodiments, a ranker module in the central server computer 10 can use an internal heuristics+machine learning based algorithm to determine the relevancy and other characteristics of an interest indicator when determining which communication to present to the end user. The interest indicator and its associated communication can then be scored. In some embodiments, the score can be computed using a formula such as:

$$\text{score}=w1*\text{cart\_relevance\_score}+w2*\text{bid\_amount}+\\w3*\text{user\_relevance\_score}+\\w4*\text{delivery\_total\_time\_score}$$

Here, $w1 \ldots wn$ can be weights associated with each score and can be adjusted based on a feedback loop on how relevant communications (e.g., advertisements) will be selected. In some embodiments, a machine learning algorithm can make these weight adjustments over time, based on actual data. In some cases, the outcome that is desired by the central server computer 10 (as well as the service providers) could be conversion of the communications into actual purchases and/or maximum revenue for the first service providers.

To ensure that scores are on a similar scale, the scores can be normalized between 0 and 1 (or any other suitable range). Once scores are calculated, top N communications/interest indicators are selected and a synchronous call can be made to track the budget usage for the communication(s). Further, in some embodiments, interest indicators and their associated communications may be removed from the selected group of N if providing them to end users would be contrary to the budgets set by the second service providers. A separate asynchronous call can also be made to track impressions and update other secondary database tables and the communications index. The top N communications of the second service providers can then be selected and shown to the user on the end user device 40 along with information or resources of the first service provider. Some communication details that may be returned to the end user device may include the title of the communication, a description of the communication, an address (URL) of the communication (e.g., an address for where an image file for the communication can be retrieved), an identifier for the resource (e.g., item) to be sold to the end user, and an identifier for the service provider offering the resource (e.g., a store identifier).

In step 422, one or more communications of resources offered by second service providers and associated with the top ranked interest indicators are then presented to the user on the user's end user device 40 along with the resources to be fulfilled by the first service provider. The user may then select one or more of the communications, and the checkout page on the application on the end user device 40 can be updated to show that the resources from both the first service provider and the second service provider are to be purchased together by the end user in a single transaction.

In step 424, the end user confirms the purchase of the resources from the first and second service provider (e.g., by selecting a "purchase" button on the application on the end user device 40). At this point, the end user may have a payment account number such as a credit or debit card number on file with the central server computer 10, and a transaction may be run for the total amount of the purchase transaction. The confirmation of the purchase by the end user on the end user device 40 causes a communication regarding the same to be provided to the central server computer 10.

In step 426, in response to receiving the communication, fulfillment instruction messages with fulfillment instructions are transmitted to the first service provider computer 30 and the second service provider computer 32, respectively. The logistics platform 20 can then determine an efficient fulfillment path for obtaining the resources from the first and second service providers and can then determine any candidate transports operating transporter user devices 50 which are capable of delivering the resources to the end user operating the end user device 40.

In step 428, one of the transporters using the transporter user device may eventually provide a confirmation that they will obtain the resources from the first and second service providers for the end user. The central server computer 10 can manage the communications between the transporter, the first service provider, the second service provider and the end user to ensure that the resources are rapidly delivered to the end user.

In step 430, the central server computer 10 can send a fulfillment response to the end user device notifying the end user that the fulfillment request will be completed soon. At some point thereafter, the transporter delivers the resources to the end user.

In step 432, once the transporter delivers resources to the end user, the transporter user device 50 sends a message to the central server computer that the delivery is complete, and an interaction completion message is sent to the end user device 40.

At a later time or even during the interaction, the funds for the purchase may be allocated between the first service provider and the second service provider, and optionally the entity that operates the central server computer 10, by the entity that operates the central server computer 10. In some embodiments, the first service provider may obtain a percentage of the sale of the resource provided by the second service provider, since the second service provider was allowed to advertise on a checkout or pre-checkout page of the first service provider. The amount paid to the first service provider can be in accordance with the bid that was present in the interest indicator that was associated with the selected communication of the second service provider.

Figure 5:
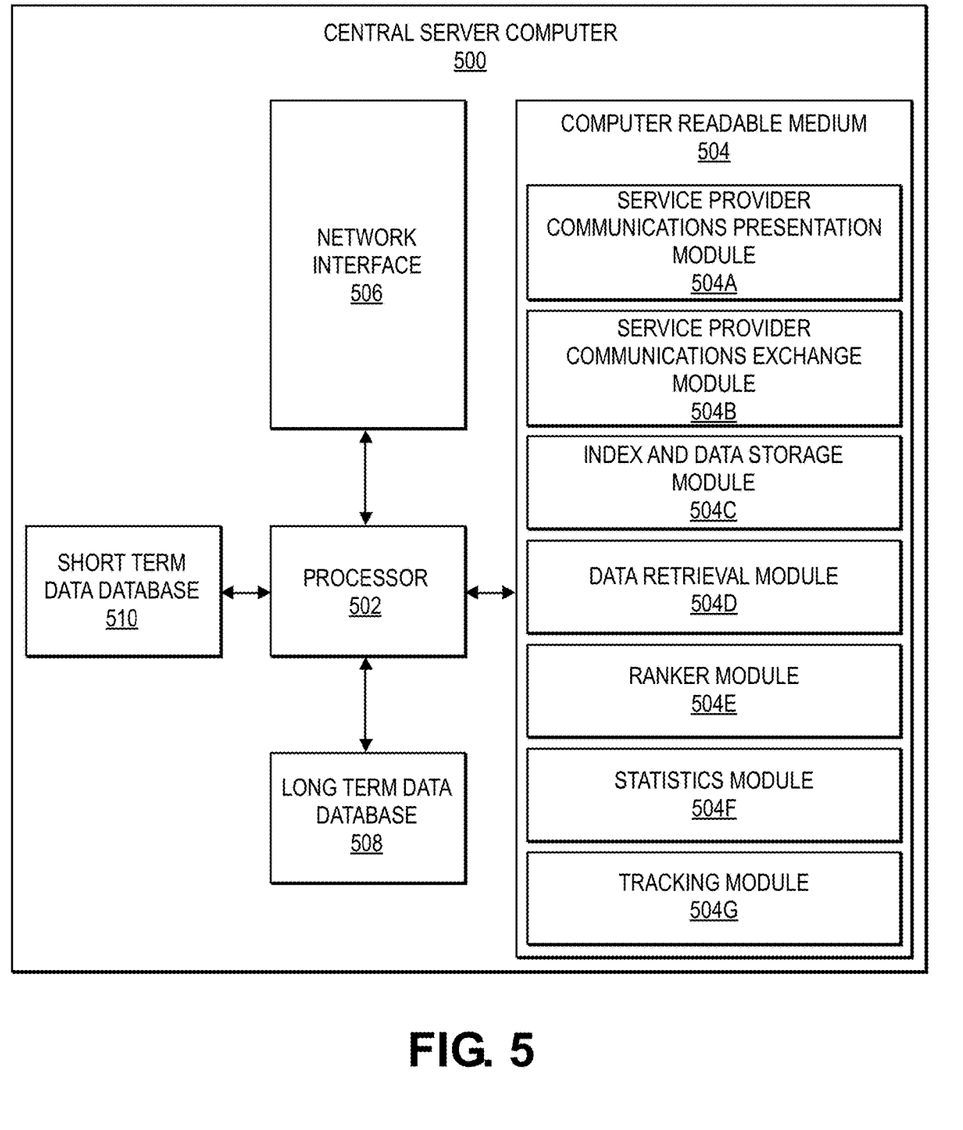
FIG. 5 shows a block diagram of a central server computer according to embodiments.

FIG. 5 shows a diagram of a central server computer 500 according to embodiments. The central server computer 500 may comprise a processor 502, which may be coupled to a computer readable medium 504, a network interface 506, a long term data database 508, and a short term data database 510. The short term data database 510 can store interest indicators and their associated communications that are retrieved and ranked in real time while an end user is in the process of purchasing resources from a first service provider on an application on an end user device. The communications may contain or be linked to image or data files that convey information about specific resources. For example, if the resource is a food item such as ice cream, then an image of the ice cream, the current price, and a description of the ice cream can be in the communication and data related thereto can be stored in a data file in the short term data database 510 (or the long term data database 508). The long term data database 508 can store the interest indicators and their associated communications. The long term data database 508 may contain interest indicators that have not yet been retrieved for either filtering or ranking. Further, the long term data database may store data regarding the resources (e.g., data regarding resources such as food to be offered for sale, descriptions of the resources, image data of images of the resources, service provider identifiers, dates of service provider or resource availability, prices of resources, etc.) of all services providers interacting with the central server computer 10. In other embodiments, a single database can be used instead of separate long and short term data databases 508, 510.

The computer readable medium 504 may comprise a number of software modules including a service provider communication presentation module 504A, a service provider communications exchange module 504B, an index and data storage module 504C, a data retrieval module 504D, a ranker module 504E, a statistics module 504F, and a tracking module 504G.

The service provider communication presentation module 504A in conjunction with the processor 502, can present communications to an interaction application on an end user device. The service provider communication presentation module 504A in conjunction with the processor 502 can format communications (e.g., advertisements) so that they are placed in predetermined regions on applications pages of applications on end user devices.

The service provider communications exchange module 504B in conjunction with the processor 502 can provide user interfaces for the service provider computers to allow them to generate and submit interest indicators to the central server computer 500. The service provider communications exchange module 504B and the processor 502 can perform similar functions as the exchange 60 in FIG. 1.

The index and data storage module 504C, in conjunction with the processor 502, can index received interest indicators and can store them in the long term data database 508 for rapid retrieval. The index and data storage module 504C and the processor 502 can perform similar functions as 110 in FIG. 3.

The data retrieval module 504D in conjunction with the processor 502 can retrieve data from the long term data database 508 or short term data database 510. The data retrieval module 504D and the processor 502 can use the logic described above when retrieving data from the databases 508, 510.

The ranker module 504E, in conjunction with the processor 502, can rank interest indicators and their associated communications, as described above.

The statistics module 504F, in conjunction with the processor 502, can determine statistics that can be used by the service providers to make decisions regarding the use of their communications in conjunction with the presentation of resources of other service providers. Such statistics can include how often a service provider's communications are selected for presentation, where the service provider's communications are presented, and how often the service provider's communication as acted upon by end users.

The tracking module 504G, in conjunction with the processor 502, can track the service provider's interest indicators' selection by the central server computer 500 against any budgets that may have been set by the service providers. The tracking module 504G, in conjunction with the processor 502, can also track any payments made between service providers for allowing them to place communications on each other's pages on an interaction application. The tracking module 504G and the processor 502 can perform functions similar to the tracking module 120 in FIG. 3.

The computer readable medium 504 may also comprise code, executable by the processor 502 for performing operations including a) storing, by a central server computer in a database, one or more interest indicators for providing communications for resources associated with a plurality of second service providers; b) receiving, by a central server computer, a fulfillment request from an application in an end user device, the fulfillment request being for one or more resources to be fulfilled by a first service provider; c) identifying, by the central server computer one or more transporters operating one or more transport user devices that are capable of satisfying the fulfillment request; d) retrieving, by the central server computer, the stored interest indicators associated with the second service providers from the database; e) determining, by the central server computer, one or more interest indicators from the retrieved interest indicators associated with the second service providers; and f) providing, by the central server computer, one or more communications associated with the determined one or more interest indicators of one or more second service providers to the application in the end user device along with a display of a service provider identifier associated with the first service provider or the one or more resources to be fulfilled by the first service provider.

Figure 6:
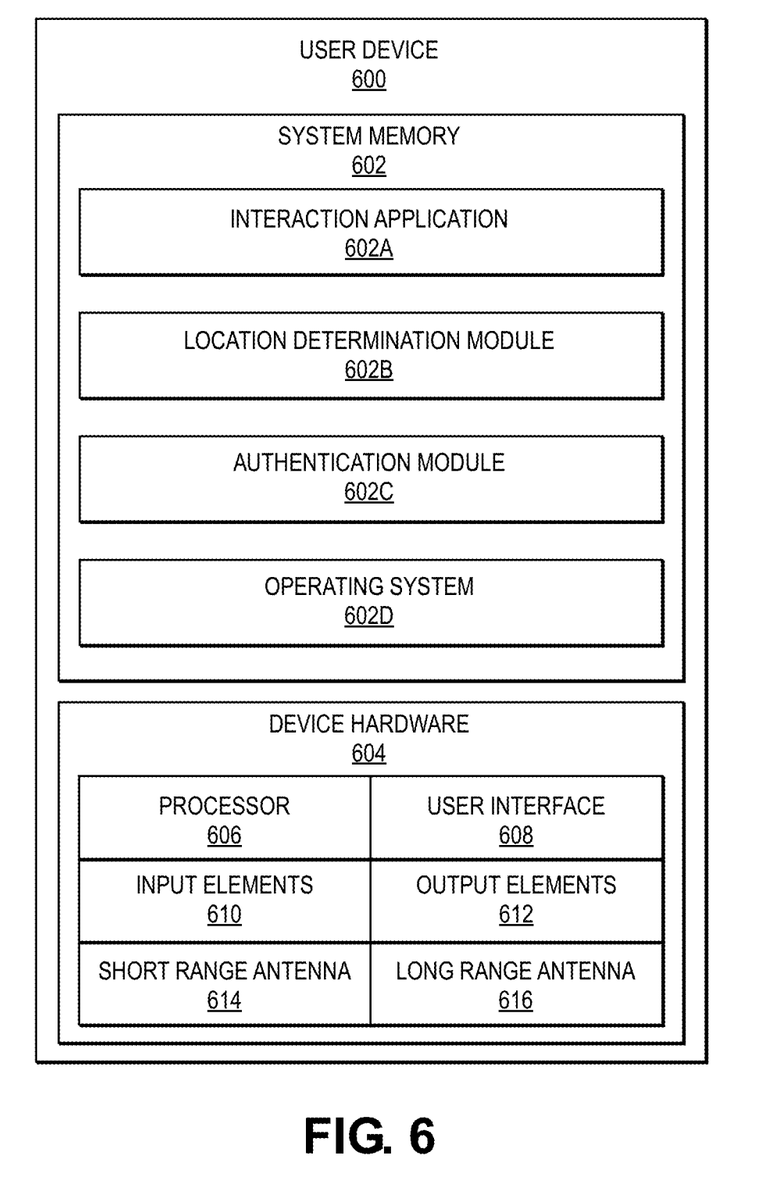
FIG. 6 shows a block diagram of a user device according to embodiments.

FIG. 6 illustrates a user device 600 according to an embodiment. User device 600 may include device hardware 604 coupled to a system memory 602.

Device hardware 604 may include a processor 606, a short range antenna 614, a long range antenna 616, input elements 610, a user interface 608, and output elements 612 (which may be part of the user interface 608). Examples of input elements may include microphones, keypads, touchscreens, sensors, etc. Examples of output elements may include speakers, display screens, and tactile devices. The processor 606 can be implemented as one or more integrated circuits (e.g., one or more single core or multicore microprocessors and/or microcontrollers) and is used to control the operation of user device 600. The processor 606 can execute a variety of programs in response to program code or computer-readable code stored in the system memory 602 and can maintain multiple concurrently executing programs or processes.

The long range antenna 616 may include one or more RF transceivers and/or connectors that can be used by user device 600 to communicate with other devices and/or to connect with external networks. The user interface 608 can include any combination of input and output elements to allow a user to interact with and invoke the functionalities of user device 600. The short range antenna 614 may be configured to communicate with external entities through a short range communication medium (e.g. using Bluetooth, Wi-Fi, infrared, NFC, etc.). The long range antenna 819 may be configured to communicate with a remote base station and a remote cellular or data network, over the air.

The system memory 602 can be implemented using any combination of any number of non-volatile memories (e.g., flash memory) and volatile memories (e.g., DRAM, SRAM), or any other non-transitory storage medium, or a combination thereof media. The system memory 602 may store computer code, executable by the processor 606, for performing any of the functions described herein.

The system memory 602 may also store an interaction application 602A, a location determination module 602B, an authentication module 602C, and an operating system 602D. The interaction application 602A may be a resource delivery application such as a food delivery application. The location determination module 302B can be used to determine a location of the user device 600. The authentication module 602C may comprise code, executable by the processor 606, to authenticate a user. This can be performed using user secrets (e.g., passwords) or user biometrics.

Embodiments of the invention have several technical advantages. Embodiments of the invention provide for improved communication retrieval and selection methods. The methods can provide for rapid and effective presentation of communications of resources of second service providers to end users while they are obtaining resources provided by first service providers. A machine learning algorithm can be used to optimize the presentation of communications such that end users are likely to select them. Further, embodiments of the invention can present communications of resources of second service providers that will satisfy and end user's needs or desires, while not substantially delaying the delivery of resources from a first service provider.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising steps including:
storing, by a central server computer in a long term database, one or more interest indicators for providing communications for resources associated with a plurality of second service providers, the interest indicators comprising identifiers for resources offered by the second service providers, and maximum and minimum amounts associated with the resources of the second service providers;
receiving, by the central server computer, a fulfillment request from an application in an end user device of an end user, the fulfillment request being for one or more resources to be fulfilled by a first service provider;
identifying, by the central server computer, one or more transporters operating one or more transport user devices that are capable of satisfying the fulfillment request;

retrieving, by the central server computer, the stored interest indicators associated with the second service providers that are geographically proximate to the first service provider from the long term database and storing the retrieved interest indicators associated with the second service providers in a short term database;

ranking, by a ranker module in the central server computer, interest indicators from the retrieved interest indicators associated with the second service providers and stored in the short term database using a machine learning algorithm that scores each interest indicator using an equation that includes an amount associated with the interest indicator, and a delivery score reflecting a total time associated with delivering one or more resources associated with the retrieved interest indicator of the second service provider along with the one or more resources of the first service provider to the end user, a first weight associated with the amount and a second weight associated with the delivery score; and providing, by the central server computer, one or more communications associated with at least one of the highest ranked interest indicators of one or more of the second service providers to the application in the end user device along with a display of a service provider identifier associated with the first service provider or the one or more resources to be fulfilled by the first service provider, and wherein the one or more communications associated with the at least one of the highest ranked interest indicators of the one or more second service providers comprise resources provided by the one or more second service providers, and wherein the method further comprises:

receiving a confirmation from the end user device that the one or more resources of the one or more second service providers and the one or more resources of the first service provider are to be delivered to the end user, wherein the one or more transporters operating the one or more transport user devices satisfy the fulfillment request by delivering the one or more resources of the first service provider and the one or more resources of the one or more second service providers to the end user; and updating, by the central server computer, the first weight and the second weight based on data associated with completion of the fulfillment request to form an updated machine learning algorithm.

2. The method of claim 1, wherein the communications are advertisements.

3. The method of claim 1, wherein ranking the interest indicators comprises determining the one or more interest indicators by evaluating if each service provider in the plurality of second service providers is proximate to the first service provider, evaluating a compatibility of each of the second service providers to the first service provider, and/or evaluating conversion rates for the resources associated with the interest indicators of the second service providers.

4. The method of claim 1, wherein the one or more transporters operate vehicles and the transporter user devices are mobile phones operated by the transporters.

5. The method of claim 1, wherein the resources are food items, and the interest indicators include service provider identifiers, location data, and resource identifiers.

6. The method of claim 1, wherein ranking, by the central server computer, the interest indicators from the retrieved interest indicators associated with the second service providers comprises excluding interest indicators of second service providers that are not compatible with the first service provider.

7. The method of claim 1, wherein the interest indicators comprise service provider identifiers, resource identifiers, interest values, and communication display data.

8. The method of claim 1, wherein the long term database is an indexed database, and the one or more interest indicators are stored in the indexed database, the indexed database indexing the interest indicators by service provider identifier, resource identifier, and location.

9. The method of claim 1, wherein the steps occur in order.

10. A central server computer comprising:

a processor; and a non-transitory computer readable medium, the non-transitory computer readable medium comprising instructions, executable by the processor, for implementing operations including:

storing, in a long term database, one or more interest indicators for providing communications for resources associated with a plurality of second service providers, the interest indicators comprising identifiers for resources offered by the second service providers, and maximum and minimum amounts associated with the resources of the second service providers;

receiving a fulfillment request from an application in an end user device of an end user, the fulfillment request being for one or more resources to be fulfilled by a first service provider;

identifying one or more transporters operating one or more transport user devices that are capable of satisfying the fulfillment request;

retrieving the stored interest indicators associated with the second service providers that are geographically proximate to the first service provider from the long term database and storing the retrieved interest indicators associated with the second service providers in a short term database;

ranking, by a ranker module, interest indicators from the retrieved interest indicators associated with the second service providers and stored in the short term database using a machine learning algorithm that scores each interest indicator using an equation that includes an amount associated with the interest indicator, and a delivery score reflecting a total time associated with delivering one or more resources associated with the interest indicator of the second service provider along with the one or more resources of the first service provider to the end user, a first weight associated with the amount and a second weight associated with the delivery score; and providing one or more communications associated with at least one of the highest ranked interest indicators of one or more of the second service providers to the application in the end user device along with a display of a service provider identifier associated with the first service provider or the one or more resources to be fulfilled by the first service provider, and wherein the one or more communications associated with the at least one of the highest ranked interest indicators of the one or more second service providers comprise resources provided by the one or more second service providers, and wherein the operations further comprise:

receiving a confirmation from the end user device that the one or more resources of the one or more second service providers and the one or more resources of the first service provider are to be delivered to the end user, wherein the one or more transporters operating the one or more transport user devices satisfy the fulfillment request by delivering the one or more resources of the first service provider and the one or more resources of the one or more second service providers to the end user; and updating the first weight and the second weight based on data associated with completion of the fulfillment request to form an updated machine learning algorithm.

11. The central server computer of claim 10, wherein ranking the interest indicators comprises evaluating a compatibility of each of the second service providers to the first service provider, and/or evaluating conversion rates for the resources associated with the interest indicators of the second service providers.

12. The central server computer of claim 10, wherein the machine learning algorithm comprises an artificial neural network.

13. The central server computer of claim 10, wherein the long term database is an indexed database, and wherein the central server computer further comprises the indexed database, wherein the one or more interest indicators are stored in the indexed database, the indexed database indexing the interest indicators by service provider identifier, resource identifier, and location.

14. A system comprising:
a central server computer comprising a processor, and a non-transitory computer readable medium, the non-transitory computer readable medium comprising instructions, executable by the processor, for implementing operations including storing, in a long-term database, one or more interest indicators for providing communications for resources associated with a plurality of second service providers, the interest indicators comprising identifiers for resources offered by the second service providers, and maximum and minimum amounts associated with the resources of the second service providers, receiving a fulfillment request from an application in an end user device of an end user, the fulfillment request being for one or more resources to be fulfilled by a first service provider, identifying one or more transporters operating one or more transport user devices that are capable of satisfying the fulfillment request, retrieving the stored interest indicators associated with the second service providers that are geographically proximate to the first service provider from the long term database, and storing the retrieved interest indicators associated with the second service providers in a short term database, ranking, by a ranker module, interest indicators from the retrieved interest indicators associated with the second service providers and stored in the short term database using a machine learning algorithm that scores each interest indicator using an equation that includes an amount associated with the interest indicator, and a delivery score reflecting a total time associated with delivering one or more resources associated with the retrieved interest indicator of the second service provider along with the one or more resources of the first service provider to the end user, a first weight associated with the amount and a second weight associated with the delivery score, and providing one or more communications associated with at least one the highest ranked one or more interest indicators of one or more second service providers to the application in the end user device along with a display of a service provider identifier associated with the first service provider or the one or more resources to be fulfilled by the first service provider, and wherein the one or more communications associated with the at least one of the highest ranked interest indicators of the one or more second service providers comprise resources provided by the one or more second service providers, wherein the operations further comprise receiving a confirmation from the end user device that the one or more resources of the one or more second service providers and the one or more resources of the first service provider are to be delivered to the end user, wherein the one or more transporters operating the one or more transport user devices satisfy the fulfillment request by delivering the one or more resources of the first service provider and the one or more resources of the one or more second service providers to the end user, and updating the first weight and the second weight based on data associated with completion of the fulfillment request to form an updated machine learning algorithm; and the one or more transport user devices.

15. The method of claim 1, wherein the transporters are users that operate cars and the first service provider is a restaurant.

16. The method of claim 15, wherein the one or more resources of the first service provider and the one or more resources of the second service providers are food items.

17. The method of claim 16, wherein the equation also includes a cart relevance score, a third weight associated with the cart relevance score, and a user relevance score and a fourth weight associated with the user relevance score.

18. The method of claim 17, wherein the method further comprises updating the third weight and the fourth weight based on the data associated with the completion of the fulfillment request to form the updated machine learning algorithm.

* * * * *